United States Patent [19]

Chellapa et al.

[11] Patent Number: 4,888,136
[45] Date of Patent: Dec. 19, 1989

[54] NEW FLAME RETARDANT COMPOSITIONS OF MATTER AND CELLULOSIC PRODUCTS CONTAINING SAME

[75] Inventors: Karumpatti L. Chellapa, Houston, Tex.; Mukund C. Shah, Hazlett, N.J.

[73] Assignee: Witco Corporation, New York, N.Y.

[21] Appl. No.: 189,058

[22] Filed: May 2, 1988

[51] Int. Cl.$^4$ .................. C09K 21/00; D06P 5/00; D06M 13/34; D21D 3/00

[52] U.S. Cl. ........................................ 252/607; 8/490; 8/195; 8/116.1; 8/115.6; 106/18.11; 106/18.26; 162/159; 252/602; 252/608; 252/7; 260/DIG. 24; 427/393.3

[58] Field of Search ............... 252/601, 607, 602, 608; 252/7; 162/159, 160; 169/45; 260/DIG. 24; 427/393.3, 440; 428/920, 921; 8/115.51, 181, 490; 106/15.05, 18.11, 18.26, 18.33

[56] References Cited

U.S. PATENT DOCUMENTS

| | | | |
|---|---|---|---|
| 683,212 | 9/1901 | Lacey | 252/7 |
| 1,278,715 | 9/1918 | Mork | 252/7 |
| 1,278,716 | 9/1918 | Mork | 252/7 |
| 1,612,104 | 12/1926 | Eichengrun | 252/607 |
| 2,106,938 | 2/1938 | Tramm et al. | 252/607 |
| 3,214,372 | 10/1965 | Lobos | 252/2 |
| 3,243,391 | 3/1966 | Wagner | 260/15 |
| 3,484,372 | 12/1969 | Birchall | 252/7 |
| 3,639,232 | 2/1972 | Busch, Jr. | 106/15.05 |
| 3,671,376 | 6/1972 | Okazaki et al. | 161/165 |
| 3,796,596 | 3/1974 | Daigle et al. | 252/607 |
| 3,834,937 | 9/1974 | Karimori et al. | 117/115 |
| 4,306,979 | 12/1981 | Tsuji | 252/3 |

OTHER PUBLICATIONS

Kirk and Othmer, Encyclopedia of Chemical Technology, vol. 10, pp. 382, 424.
Hawley, G. 1981, The Condensed Chemical Dictionary, Van Nostrand Reinhold Co., New York, p. 42.

*Primary Examiner*—Howard J. Locker
*Attorney, Agent, or Firm*—Lockwood, Alex, FitzGibbon & Cummings

[57] ABSTRACT

This application discloses new compositions of matter useful as flame retardants for cellulosic materials comprising ammonium bromide and, at least, one water-soluble aluminum salt of an organic hydroxy acid, such as aluminum citrate or aluminum lactate.

37 Claims, No Drawings

NEW FLAME RETARDANT COMPOSITIONS OF MATTER AND CELLULOSIC PRODUCTS CONTAINING SAME

BACKGROUND OF THE INVENTION

This invention relates to improved flame retardants. In particular, this invention relates to water-soluble flame retardants useful for imparting flame retardance to cellulosic materials.

Cellulosic materials such as paper, fiberboard, straw, wood and textiles, such as cotton and wool, are highly useful materials whose utility is increased when their natural characteristic of being flammable is diminished. Thus, it is well recognized that the imparting of fire resistant properties to these otherwise highly flammable cellulosic materials increases the usefulness of the treated material.

Usually it is not practicable and sometimes it is not possible to make these flammable materials completely fire resistant or self-extinguishing. However, it is desirable to provide such materials with sufficient fire retardant properties to delay appreciably the propagation of the flame. It is also most desirable to prevent "afterglow;" that is, to prevent the material from continuing to smolder or burn at a very slow rate after the flame itself is extinguished. If afterglow occurs, the flame could break out again, or the material could be consumed or partially consumed because of the afterglow.

In teating these cellulosic materials to render them fire retardant, it is especially important that the treating method or additives do not impair the desirable natural characteristics and properties of the treated material, such as, its strength, flexibility, resistance to abrasion, color and the like. Also, any flame retardant additives or treating procedure should produce a uniform result so that the material treated does not have its properties adversely effected in spots or localized areas and, of course, the fire retardant characteristics should be uniform. The procedure or method for treating the material must be simple and easy to utilize with conventional equipment, inasmuch as the treated materials are almost always ordinary products of commerce, so that practical and inexpensive procedures are indicated.

In treating cellulosic materials with flame retardants, it is necessary that the treatment not add disadvantageous properties to the cellulosic material. One of the undesired results of treating cellulosic materials with flame retardants has been to discolor or darken the treated cellulosic product Also, certain flame retardant additives can diminish the strength of the cellulosic material to which they are applied.

Certain of the methods for flame treating cellulose materials require the use of an organic solvent, which is expensive and difficult to use and can adversely affect the flexibility of the cellulosic material. In this regard, U.S. Pat. No. 3,243,391 teaches the use of an isopropanol solution.

Also, British Patent No. 688,372 teaches the use of a partially polymerized brominated triallyl phosphate in an organic solvent to treat cotton for flame retardance.

Water-soluble, inorganic flame retardants have been in use for some time to impart flame retardance to normally flammable materials. These water-soluble compounds include salts of sulfuric, phosphoric, hydrochloric and hydrobromic acid. Particular usefulness has been found for the ammonium salts including ammonium sulfate, ammonium phosphate, ammonium chloride and ammonium bromide. While these compounds can be used alone, it also has been established that mixtures of these water-soluble flame retardants with borax have functional advantages. These materials are advantageous since they can be conveniently applied to the normally flammable material by such known procedures as spraying, dipping and brushing. Yet, these flame retardant additives have not been totally satisfactory.

U.S. Pat. Nos. 3,671,376 and 3,834,937 refer to ammonium bromide and ammonium chloride as conventional flame retarding agents for wool and paper. U.S. Pat. No. 2,986,478 discloses the making of flame-proofed, water resistant paper with various water-soluble, flameproofing salts including ammonium chloride by dissolving it in the aqueous phase of rosin-wax particle suspensions.

Kirk-Othmer, Encyclopedia of Chemical Technology, Volume 10, page 424 in Table 1 lists water-soluble flame retardants for textiles. Included in this table is ammonium bromide as the only flame retardant stated to be used as a 100% composition. This treatise on page 382 of Volume 10 highlights bromine compounds as having inherent properties that make them excellent flame retardants. In comparison to chlorine compounds, bromine compounds are about twice as effective as chlorine compounds having the same halogen content on a weight basis.

Yet, the use of ammonium bromide as a fire retardant has not been as commonas it could be due to various factors including the corrosiveness of the product. Also, while ammonium bromide has excellent fire resistance properties, its usefulness would be improved with the increase in the effectiveness of the application of the composition, which would decrease the amount of brominated material in contact with the metallic surface of the equipment used for the application of flame retardant to the cellulosic material.

Accordingly, it is an object of the present invention to devise new water-soluble flame retardant compositions of matter.

Another object of the present invention is to devise new flame retardants for cellulosic materials.

Still another object of the present invention is the preparation of paper products having improved flame retardance.

It is another object of the present invention to improve the effectiveness of the use of ammonium bromide.

Other objects of the present invention will become apparent from the ensuing description.

SUMMARY OF THE INVENTION

The present invention is directed to new compositions of matter useful as flame retardants for cellulosic materials comprising ammonium bromide and at least one water-soluble aluminum salt of an organic hydroxy acid, preferably an organic hydroxy carboxylic acid. The water-soluble, organic aluminum salt need be present in an amount sufficient to enhance the flame retardance of the ammonium bromide. In addition, the present invention includes cellulosic materials such as textiles, wood and paper impregnated with a flame retardant composition comprising a combination of at least one water-soluble aluminum salt of an organic hydroxy acid and ammonium bromide and a method for their preparation.

DETAILED DESCRIPTION OF THE INVENTION

The present invention is directed to the combination of ammonium bromide and a flame retardant enhancing amount of at least one water-soluble aluminum salt of an organic hydroxy acid, preferably an organic hydroxy carboxylic acid. While ammonium bromide is a known, effective flame retardant for cellulosic materials, it has now been found that its effectiveness can be significantly enhanced by it being combined with a flame retardant enhancing amount of a water-soluble, aluminum salt of an organic hydroxy acid. Among the useful water-soluble aluminum salts are aluminum citrate, aluminum lactate, aluminum tartrate and the like. In this regard it has also been found that mixtures of ammonium bromide and other water-soluble ammonium salts can also be used. For example, ammonium sulfate and ammonium bromide form a useful combination of water-soluble ammonium salts. Since ammonium bromide, an effective flame retardant, is also a corrosive compound, the use of ammonium sulfate permits the use of lesser amounts of ammonium bromide.

Unexpectedly, it has been found that when one or more water-soluble, aluminum salt of an organic hydroxy acid is used in admixture with ammonium bromide there is obtained a flame retardant composition that imparts flame retardant properties to cellulosic materials that are not obtained by the application of either the water-soluble, organic, aluminum salt or ammonium bromide alone. This composition requires the water-soluble aluminum salt to be present in an amount sufficient to enhance the flame retardance of the ammonium bromide. Normally, this requires the organic, aluminum salt to be present in an amount from about 25 to about 50 weight percent or higher of the ammonium bromide.

In order that the present flame retardant composition be effective, it is necessary that the cellulosic compositions be treated with an amount thereof that will impart the desired flame retardant properties. Thus, scope of the present invention includes flame retardant compositions comprising cellulosic material and an effective amount of a flame retardant composition comprising ammonium bromide and a flame retardant enhancing amount of at least one water-soluble aluminum salt of an organic hydroxy acid, preferably an organic hydroxy carboxylic acid. The actual amount of the flame retardant composition that need be used will depend on numerous factors including the identification of the cellulosic material, the use that the cellulosic material will perform, the amount of organic aluminum salt and other components in the flame retardant composition, and the like. For uses such as with paper, as the tests included in this patent indicate often as much as at least about 50 weight percent of the cellulosic material must be applied of the flame retardant composition. Other amounts may be required for other applications.

The flame retardant composition can also contain additional components normally used in flame retardant compositions. Thus, the use of softening agents for the cellulosic material, anti-corrosion additives, other fire retardants and the like is included within the scope of the present invention. For example, additives such as boric acid, borax, urea, sodium molybdate, trialkyl and triaryl phosphates, antimony oxides, chlorinated parafins, dimethylol urea, sodium benzoate, sodium nitrite, aminobenzoic acid, sorbitol, tartaric acid, salts of tartaric acid, phthalic acid, mono-, di- and triethanol amines, mixtures thereof and the like can be present in the present compositions. Still other additives well known to the paper, textile and flame retardant industry can also be present in the compositions of this invention The following example illustrate the advantages obtained from the present invention.

It should be understood that while the example used a specific water-soluble organic aluminum salt, that other water-soluble aluminum salts of organic acids can be used with the ammonium bromide and be within the scope of the present invention.

EXAMPLE 1

The samples used in this example were prepared by dissolving the requisite amount of each ingredient in distilled water as follows: Aluminum lactate was added to distilled water and ammonium hydroxide (37% solution) was added to prepare a solution having a pH of approximately 4. Ammonium bromide (41% solution) was then added to this mixture with stirring. Then urea was added and the pH of the solution was adjusted to 6.0–7.0 by the addition of ammonia. Sufficient water was added to raise the total weight of the solution to 100 grams. In samples 4–6 ammonium sulfate was also added to the solution.

The weight percent of each component was as follows:

| SAMPLE NO. | Ammonium Bromide (41% Solution) | Aluminum Lactate | Ammonium Sulfate | Urea |
| --- | --- | --- | --- | --- |
| 1 | 24 | 10 | 0 | 5 |
| 2 | 36 | 10 | 0 | 5 |
| 3 | 48 | 10 | 0 | 5 |
| 4 | 24 | 10 | 10 | 5 |
| 5 | 31 | 10 | 7 | 5 |
| 6 | 36 | 10 | 5 | 5 |

The flame retardance of the six samples was determined by coating a 4"×6" sheet of kraft paper with the six solutions on the uncoated side of each sheet of kraft paper and then drying the test paper at 150° C. for 2–3 minutes for the vertical flame test. The drying at 150° C. was continued for one hour for determining the heat stability. A color index was developed to measure the color of the paper at the end of each fifteen minute period. No change in color was denoted by #1; light brown or yellow by #4; dark brown or yellow by #6, 7 and 8 and black by #12 or higher.

Then the flame retardant solution was tested in a vertical testing chamber equipped with a bunsen burner, clamping device to vertically suspend the test specimen and a device to light the burner and keep it burning. The 1½" test flame is applied to the vertically suspended specimen at the center of the lower edge for four seconds. The bottom edge of the test specimen hangs ¾" into the flame. The length of the burned portion of the specimen expressed as char length is measured. The results of these tests were as follows:

| SAMPLE | WEIGHT PERCENT ADD ON | COLOR INDEX | | | VERTICAL TEST Char Length (Mm) |
| --- | --- | --- | --- | --- | --- |
| | | 15 min | 30 min | 45 min | |
| 1 | 30 | 4 | 6 | 8 | 75 |
| 2 | 33 | 4 | 6 | 8 | 80 |
| 3 | 45 | 3 | 4 | 6 | 60 |

-continued

| SAMPLE | WEIGHT PERCENT ADD ON | COLOR INDEX 15 min | 30 min | 45 min | VERTICAL TEST Char Length (Mm) |
|---|---|---|---|---|---|
| 3 | 55 | 1 | 1 | 1 | 10 |
| 4 | 40 | 3 | 4 | 6 | 70 |
| 4 | 55 | 1 | 1 | 1 | 10 |
| 5 | 33 | 3 | 4 | 6 | 50 |
| 6 | 43 | 3 | 4 | 6 | 65 |

It can be seen from the foregoing data that by the application of a composition containing ammonium bromide and aluminum lactate to kraft paper at a weight percent add on of about 55%, that the paper did not change color after being dried at 150° C. In addition, the char length of this treated kraft paper after application of a 1½" test flame was 10 mm; whereas, kraft paper not containing this combination and amount of the composition had a char length of from 50–80 mm. Thus, the addition of this requisite amount of the composition of the present invention gave flame retardance properties not otherwise obtained.

EXAMPLE 2

The samples used in this example were prepared by dissolving the requisite amount of each ingredient in distilled water as follows: Aluminum lactate or citrate as required was added to distilled water and ammonium hydroxide (37% solution) was added to form a solution having a pH of approximately 6. Ammonium bromide (41% solution) was then added to this mixture with stirring. Then urea was added and the pH of the solution was adjusted to 6.0–7.0 by the further addition of ammonium hydroxide. Sufficient water was added to raise the total weight of the solution to 100 grams. The weight percent of each component was as follows:

| SAMPLE NO. | Ammonium Bromide (41% Solution) | Aluminum Lactate | Aluminum Citrate | Urea | Ammonium Hydroxide (37% Solution) |
|---|---|---|---|---|---|
| 1 | 0 | 10 | 0 | 5 | 4.5 |
| 2 | 0 | 0 | 10 | 5 | 4.5 |
| 3 | 24 | 10 | 0 | 5 | 4.5 |
| 4 | 24 | 0 | 10 | 5 | 4.5 |
| 5 | 12 | 0 | 10 | 5 | 4.9 |

The flame retardance of the six samples was determined by coating a 4"×6" sheet of kraft paper with the six solutions on each sheet of kraft paper and then drying the test paper at 150° C. for 2–3 minutes for the vertical flame test.

Then the flame retardant solution was tested in a vertical testing chamber equipped with a bunsen burner, clamping device to vertically suspend the test specimen and a device to light the burner and keep it burning. The 1½" test flame is applied to the vertically suspended specimen at the center of the lower edge for four seconds. The bottom edge of the test specimen hangs ¾" into the flame. The length of the burned portion of the specimen expressed as char length is measured. The results of these tests were as follows:

| | FLAME TEST | | | |
|---|---|---|---|---|
| | % Add On | Afterburn Sec | Char Length cm | Smoke (Visual) |
| Sample 1 | 34.5 | 9 | BEL | Low or None |
| " | 51.3 | 9 | BEL | Low or None |
| " | 58.4 | 12 | BEL | Low or None |
| " | 69.0 | 11 | BEL | Low or None |
| " | 91.3 | 12 | BEL | Low or None |
| " | 111.5 | 14 | BEL | Low or None |
| Sample 2 | 25.0 | 6 | BEL | Low or None |
| " | 26.5 | 8 | BEL | Low or None |
| " | 47.5 | SE | 8.0 | Low or None |
| Sample 3 | 17.3 | SE | 8.5 | Low |
| " | 29.3 | SE | 6.5 | Low |
| " | 40.7 | SE | 7.0 | Low |
| " | 51.7 | SE | 6.5 | Low |
| " | 68.3 | SE | 3.5 | Low |
| Sample 4 | 16.8 | SE | 6.5 | Low |
| " | 28.9 | SE | 5.5 | Low |
| " | 49.4 | SE | 5.5 | Low |
| Sample 5 | 60.9 | SE | 6.0 | Low |
| Control Without Flame Retardant | 0 | 6 | BEL | Low |

SE = Self-extinguishing
BEL = Burned entire length

It can be seen from the foregoing data that the application of a composition containing ammonium bromide and aluminum lactate or aluminum citrate to kraft paper (Samples 3–5) resulted in improved flame retardance not obtained from untreated kraft paper or paper treated with aluminum lactate or aluminum citrate alone (Samples 1 and 2).

In applying the flame retardants of this invention to the cellulosic compositions, known procedures of dipping, spraying, painting and the like can be easily used. These methods are well recognized in the art for the application of water-soluble flame retardants ad can be used for the application of the new composition of the present invention. This means that it is not necessary to acquire unique equipment or to use unusual techniques in order to benefit from the advantages available from these compositions. It is, furthermore, not necessary to employ hazardous solvents or other environmentally hazardous materials that require unique installations or procedures.

It will be apparent to those of ordinary skill in this art that certain modifications can be made in the present composition without departing from the spirit and scope thereof.

We claim:

1. A com position useful as a flame retardant for cellulosic material which comprises ammonium bromide and a flame retardant enhancing amount of at least one water-soluble aluminum salt of an organic hydroxy acid.

2. A composition of claim 1, wherein the organic hydroxy acid is an organic hydroxy carboxylic acid.

3. A composition of claim 1, wherein the water-soluble aluminum salt is aluminum citrate, aluminum lactate, or aluminum tartrate.

4. A composition of claim 1, wherein the water-soluble aluminum salt is aluminum lactate.

5. A composition of claim 1, wherein the water-soluble aluminum salt is aluminum tartrate.

6. A composition of claim 1, wherein the water-soluble, aluminum salt is aluminum citrate.

7. The composition of claim 1, which comprises ammonium sulfate as a second water-soluble ammonium salt.

8. The composition of claim 1, which comprises urea as an additional component.

9. The composition of claim 1, which comprises one or more anti-corrosion compounds as additional components.

10. The composition of claim 1, wherein the water-soluble aluminum salt is present in an amount of at least about 25 percent by weight of the ammonium bromide.

11. The composition of claim 10, wherein the water-soluble aluminum salt is present in an amount of between about 25 percent and about 50 percent by weight of the ammonium bromide.

12. A flame retardant cellulosic composition comprising cellulosic material and a flame retardant effective amount of a flame retardant composition comprising ammonium bromide and a flame retardant enhancing amount of at least one water-soluble aluminum salt of an organic hydroxy acid.

13. A flame retardant cellulosic composition of claim 12, wherein the cellulosic material is paper.

14. A flame retardant cellulosic composition of claim 12, wherein the cellulosic material is kraft paper.

15. A flame retardant cellulosic composition of matter of claim 13, wherein the cellulosic material is wood.

16. A flame retardant composition of matter of claim 12, wherein the cellulosic material is a textile.

17. A flame retardant composition of matter of claim 16, wherein the textile is cotton.

18. A flame retardant cellulosic composition of claim 12, wherein the flame retardant composition is present in an amount of at least about 50 weight percent of the cellulosic material.

19. A flame retardant cellulosic composition of claim 12, wherein the water-soluble aluminum salt is present in an amount of from about 25 to about 50 weight percent of the ammonium bromide.

20. A flame retardant cellulosic composition of claim 12, wherein the flame retardant composition comprises one or more anti-corrosion compounds as additional components.

21. A flame retardant cellulosic composition of claim 12, wherein the flame retardant composition comprises urea as an additional component.

22. A flame retardant cellulosic composition of claim 12, wherein the flame retardant composition comprises ammonium sulfate as a second water soluble ammonium salt.

23. A flame retardant cellulosic composition of claim 22, wherein the ammonium sulfate is present in an amount between about 25 and about 50 weight percent of the ammonium bromide.

24. A flame retardant cellulosic composition of claim 12, wherein the water-soluble aluminum salt is aluminum citrate, aluminum lactate or aluminum tartrate.

25. A flame retardant cellulosic composition of claim 22, wherein the water-soluble aluminum salt is aluminum lactate.

26. A flame retardant cellulosic composition of claim 22, wherein the water-soluble aluminum salt is aluminum tartrate.

27. A flame retardant cellulosic composition of claim 22, wherein the water-soluble aluminum salt is aluminum citrate.

28. A flame retardant composition of claim 25, wherein the aluminum lactate is present in an amount between about 25 and about 50 weight percent of the ammonium bromide.

29. A method for rendering a cellulosic material flame retardant which comprises treating said cellulosic material with a flame retarding amount of an aqueous composition comprising ammonium bromide and a flame retardant enhancing amount of at least one water-soluble aluminum salt of an organic hydroxy acid.

30. A method of claim 29 wherein the flame retardant amount is at least about 50 weight percent of the weight of the cellulosic material.

31. A method of claim 29, wherein the water-soluble aluminum salt is aluminum citrate, aluminum lactate or or aluminum tartrate.

32. A method of claim 31, wherein the water-soluble aluminum salt is aluminum lactate.

33. A method of claim 29, which comprises ammonium sulfate as a second water-soluble ammonium compound.

34. A method of claim 29, which comprises urea as an additional component.

35. A method of claim 29, which comprises one or more anti-corrosion compounds as additional components.

36. A method of claim 30, wherein the water-soluble aluminum salt is present in an amount of at least about 25 percent by weight of the ammonium bromide.

37. A method of claim 35, wherein the water-soluble aluminum salt is present in an amount of between about 25 percent and about 50 percent by weight of the ammonium bromide.

* * * * *